United States Patent
Wagner et al.

(10) Patent No.: US 9,562,744 B2
(45) Date of Patent: Feb. 7, 2017

(54) SOFT BODY ARMOR HAVING ENHANCED ABRASION RESISTANCE

(75) Inventors: Lori L. Wagner, Richmond, VA (US); Harold Lindley Murray, Jr., North East, MD (US); Brian H. Waring, Chester, VA (US); David A. Steenkamer, Midlothian, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 932 days.

(21) Appl. No.: 12/456,185

(22) Filed: Jun. 13, 2009

(65) Prior Publication Data

US 2012/0174753 A1     Jul. 12, 2012

(51) Int. Cl.

| F41H 5/08 | (2006.01) |
|---|---|
| F41H 1/02 | (2006.01) |
| B32B 5/12 | (2006.01) |
| B32B 27/12 | (2006.01) |
| B32B 5/02 | (2006.01) |
| F41H 5/04 | (2006.01) |

(52) U.S. Cl.
CPC ............ *F41H 1/02* (2013.01); *B32B 5/024* (2013.01); *B32B 5/12* (2013.01); *B32B 27/12* (2013.01); *F41H 5/0485* (2013.01); *B32B 2571/02* (2013.01); *Y10T 29/49826* (2015.01)

(58) Field of Classification Search
CPC .... F41H 5/0485; F41H 1/02; Y10T 29/49826; B32B 5/12; B32B 5/024; B32B 27/12; B32B 2571/02
See application file for complete search history.

(56) References Cited

U.S. PATENT DOCUMENTS

| 3,671,542 A | 6/1972 | Kwolek .................. 524/157 |
| 3,975,487 A | 8/1976 | Cottis et al. .............. 264/210.6 |
| 4,090,005 A * | 5/1978 | Morgan .................. 428/76 |
| 4,118,372 A | 10/1978 | Schaefen .................. 528/190 |
| 4,137,394 A | 1/1979 | Meihuizen et al. .......... 528/100 |
| 4,161,470 A | 7/1979 | Calundann ............... 524/599 |
| 4,169,181 A | 9/1979 | Molari .................. 428/217 |
| 4,356,138 A | 10/1982 | Kavesh et al. .............. 264/164 |
| 4,413,110 A | 11/1983 | Kavesh et al. ............ 526/348.1 |
| 4,430,383 A | 2/1984 | Smith et al. ............... 428/364 |
| 4,436,689 A | 3/1984 | Smith et al. .............. 264/204 |
| 4,440,711 A | 4/1984 | Kwon et al. .............. 264/185 |
| 4,457,985 A | 7/1984 | Harpell et al. ............ 428/224 |
| 4,535,027 A | 8/1985 | Kobashi et al. ............ 428/364 |
| 4,536,536 A | 8/1985 | Kavesh et al. ............. 524/462 |
| 4,545,950 A | 10/1985 | Motooka et al. ......... 264/210.6 |
| 4,551,296 A | 11/1985 | Kavesh et al. .............. 264/203 |
| 4,599,267 A | 7/1986 | Kwon et al. ............. 428/364 |
| 4,612,148 A | 9/1986 | Motooka et al. ............. 264/49 |
| 4,617,233 A | 10/1986 | Ohta et al. .............. 428/364 |
| 4,663,101 A | 5/1987 | Kavesh et al. ........... 264/178 F |
| 4,737,401 A * | 4/1988 | Harpell et al. ............. 442/187 |
| 5,032,338 A | 7/1991 | Weedon et al. ............. 264/203 |
| 5,204,170 A * | 4/1993 | Kuyzin .................. 442/274 |
| 5,246,657 A | 9/1993 | Yagi et al. .............. 264/210.6 |
| 5,286,435 A | 2/1994 | Slukster et al. ............ 264/205 |
| 5,342,567 A | 8/1994 | Chen et al. .............. 264/203 |
| 5,398,340 A | 3/1995 | Kibbee .................. 2/2.5 |
| 5,567,498 A * | 10/1996 | McCarter et al. ........... 428/113 |
| 5,578,374 A | 11/1996 | Dunbar et al. .............. 428/364 |
| 5,674,969 A | 10/1997 | Sikkema et al. ............ 528/183 |
| 5,702,657 A | 12/1997 | Yoshida et al. .............. 264/112 |
| 5,736,244 A | 4/1998 | Kavesh et al. ............. 428/364 |
| 5,741,451 A | 4/1998 | Dunbar et al. .............. 264/103 |
| 5,926,842 A * | 7/1999 | Price .................. F41H 5/0478 2/2.5 |
| 5,939,553 A | 8/1999 | Reichwein et al. .......... 546/250 |
| 5,945,537 A | 8/1999 | Sikkema | |
| 5,958,582 A | 9/1999 | Dunbar et al. ............. 428/364 |
| 5,972,498 A | 10/1999 | Kavesh et al. ............. 428/364 |
| 6,040,478 A | 3/2000 | Sikkema et al. ............ 562/424 |
| 6,119,575 A * | 9/2000 | Dragone et al. ............. 89/36.05 |
| 6,368,989 B1 * | 4/2002 | Pascual et al. .............. 442/254 |
| 6,448,359 B1 | 9/2002 | Kavesh .................. 526/352 |
| 6,642,159 B1 | 11/2003 | Bhatnagar et al. .......... 442/134 |
| 6,818,091 B1 | 11/2004 | Holland et al. ........... 156/309.6 |
| 6,862,971 B2 | 3/2005 | Ramkumar .............. 89/36.02 |
| 6,969,553 B1 | 11/2005 | Tam et al. .................. 428/394 |
| 7,344,668 B2 | 3/2008 | Tam et al. .................. 264/210.8 |
| 2005/0255776 A1 | 11/2005 | Howland ............... 428/286 |
| 2006/0210749 A1* | 9/2006 | Geva et al. .............. 428/36.1 |
| 2007/0163023 A1* | 7/2007 | Steeman ............... B32B 5/02 2/2.5 |
| 2007/0194490 A1* | 8/2007 | Bhatnagar et al. ............ 264/258 |
| 2008/0102721 A1 | 5/2008 | Holland et al. ............. 442/62 |
| 2008/0206525 A1* | 8/2008 | Jacobs et al. ............. 428/195.1 |
| 2008/0241494 A1 | 10/2008 | Ardif et al. .............. 428/219 |
| 2009/0025111 A1* | 1/2009 | Bhatnagar et al. ............. 2/2.5 |
| 2009/0068453 A1 | 3/2009 | Chung .................. 428/337 |
| 2009/0163098 A1* | 6/2009 | Ardiff .................. F41H 5/0471 442/164 |

FOREIGN PATENT DOCUMENTS

| JP | 05125152 A * | 5/1993 |
| WO | WO2008121677 A1 | 10/2008 |
| WO | WO2008137218 A1 | 11/2008 |

* cited by examiner

*Primary Examiner* — Elizabeth M Cole
(74) *Attorney, Agent, or Firm* — Roberts & Roberts, LLP; Richard S. Roberts, Jr.

(57) ABSTRACT

Flexible composite materials and soft body armor formed therefrom having enhanced abrasion resistance. The materials and armor include at least one first separator layer positioned between adjacent fabric layers, or between a fabric layer and a cover, where the separator layer spaces the adjacent fabric layers or the fabric layer and cover apart from each other without being laminated or otherwise attached or connected to either the layers or the cover such that they are free to move relative to each other.

37 Claims, No Drawings

SOFT BODY ARMOR HAVING ENHANCED ABRASION RESISTANCE

BACKGROUND OF THE INVENTION

Field of the Invention

This invention relates to body armor, in particular soft body armor which has improved properties, composite materials useful for such body armor, and to a method of enhancing the abrasion resistance of soft body armor.

Description of the Related Art

Ballistic resistant products, such as body armor, are known in the art. They may be of the hard (or rigid) or soft (or flexible) types. Many of these products are based on high tenacity fibers, and are used in such applications such as bullet-resistant vests.

Hard or rigid body armor generally provides good ballistic resistance, but can be very stiff and bulky. Accordingly, body armor garments, such as ballistic resistant vests, are preferably formed from soft or flexible armor materials, and they exhibit excellent ballistic properties. Examples of typical constructions are those based on a woven aramid fabric or a cross-plied aramid or polyethylene non-woven unidirectional fabric, or combinations of such materials with other layers. These materials have met with great success in providing protection against various ballistic and other threats.

It would be desirable to provide improvements in such soft body armor, especially in hybrid constructions where different ballistic fabrics or fibers are used.

SUMMARY OF THE INVENTION

In accordance with this invention, there is provided soft body armor comprising:

a cover, at least one stack of a plurality of woven fabric layers positioned within the cover, at least one stack of a plurality of second fabric layers also positioned within the cover and being adjacent to the stack of a plurality of woven fabric layers, the second fabric layers comprising high tenacity fibers having a tenacity of at least about 7 g/d, a first separator layer positioned between the stack of woven fabric layers and the stack of second fabric layers, the first separator layer comprising a lightweight, thin and flexible layer having an areal density of less than or equal to about 150 g/m$^2$, the separator layer not being laminated to either of the stack of woven fabric layers or the stack of second fabric layers such that the two stacks of layers are free to move relative to each other, and a second separator layer positioned between the stack of second fabric layers and the cover, the second separator layer comprising a lightweight, thin and flexible layer having an areal density of less than or equal to about 150 g/m$^2$, the second separator layer not being laminated to either of the stack of second fabric layers or the cover such that the stack of second fabric layers and the cover are free to move relative to each other.

Also in accordance with this invention, there is provided soft body armor comprising:

at least one woven fabric layer, at least one second fabric layer comprising high tenacity fibers having a tenacity of at least about 7 g/d, and a first separator layer positioned between the woven fabric and the second fabric layer, the first separator layer comprising a lightweight, thin and flexible layer having an areal density of less than or equal to about 150 g/m$^2$, the separator layer not being laminated to either of the woven fabric or the second fabric such that the woven fabric and the second fabric are free to move relative to each other.

In further accordance with this invention, there is provided a flexible ballistic composite useful in soft body armor applications, the composite comprising:

at least one woven fabric layer, at least one second fabric layer comprising high tenacity fibers having a tenacity of at least about 7 g/d, and a first separator layer positioned between the woven fabric layer and the second fabric layer, the first separator layer comprising a lightweight, thin and flexible layer having an areal density of less than or equal to about 150 g/m$^2$, the first separator layer not being laminated to either of the woven fabric layer or the second fabric layer such that the woven fabric layer and the second fabric layer are free to move relative to each other.

Additionally in accordance with this invention, there is provided soft body armor comprising:

a cover, at least one fabric layer comprising high tenacity fibers having a tenacity of at least about 7 g/d, the non-woven fabric layer having a first side and a second side, a first separator layer positioned between the cover and the first side of the fabric layer, the first separator layer comprising a lightweight, thin and flexible layer having an areal density of less than or equal to about 150 g/m$^2$, the first separator layer not being laminated to either the cover or the first side of the fabric layer, such that the first side of the fabric layer and the cover are free to move relative to each other, and a second separator layer positioned between the cover and the second side of the fabric, the second separator layer comprising a lightweight, thin and flexible layer having an areal density of less than or equal to about 150 g/m$^2$, the second separator layer not being laminated to either the cover or the second side of the fabric layer, such that the second side of the fabric layer and the cover are free to move relative to each other.

Further in accordance with this invention, there is provided a method of improving the abrasion resistance of at least one component of soft body armor along at least one interface with another component of the soft body armor, the method comprising the steps of:

providing at least one woven fabric layer, providing at least one second fabric layer, the second fabric layer having a tenacity greater than about 7 g/d, and positioning a first separator layer between the woven fabric layer and the second fabric layer such that the first separator layer is not laminated to either of the woven fabric layer or the second fabric layer such that the woven fabric layer and the second fabric layer are free to move relative to each other, the first separator layer comprising a lightweight, thin and flexible layer having an areal density of less than or equal to about 150 g/m$^2$.

The present invention thus provides an improved soft body armor and components thereof that have enhanced abrasion resistance. This is achieved without reducing, or substantially reducing, the ballistic properties and other desirable properties of the soft body armor and components.

DETAILED DESCRIPTION OF THE INVENTION

The present invention comprises soft body armor which has enhanced interlaminar abrasion resistance. The present invention is also directed to laminates useful in such armor and to a method of enhancing the abrasion resistance of components of soft armor.

As mentioned above, the flexible or soft armor of this invention is in contrast to rigid or hard armor. The flexible materials and armor of this invention do not retain their shape when subjected to a significant amount of stress and are incapable of being free-standing without collapsing. This is in distinction to the characteristics of hard or rigid armor which has sufficient mechanical strength and maintains its shape when subjected to a significant amount of stress and is capable of being free-standing without collapsing.

Soft body armor products, such as bullet-resistant vests, are typically provided with a cover into which the ballistic material or materials are positioned. Soft body armor covers include woven fabrics, for example, those made from ballistic nylon, cotton, and/or other fibers. One preferred cover material is a ripstop woven fabric, preferably a ripstop woven nylon fabric. Such fabrics are known in the art and are typically made by weaving nylon threads throughout a base material in interlocking patterns. These fabrics are very resistant to tearing and ripping. The cover may alternatively be formed from a material that can be welded or heat sealed; this is especially of interest where impermeability of the cover is desired. One specific example is a fabric that is laminated to a plastic material (e.g., a urethane) that is weldable (e.g., by radio frequency welding) or heat sealable.

One example of a bullet-resistant vest of many known in the art is shown in U.S. Pat. No. 5,398,340, the disclosure of which is incorporated herein by reference to the extent not inconsistent herewith. Such vests include a woven fabric shell or cover which contains compartments or pockets into which are inserted panels of impact absorbing antiballistic materials.

The soft body armor of this invention includes a flexible ballistic composite that includes at least one woven fabric layer and at least one second fabric layer. Preferably there is a plurality of woven fabric layers, and preferably these are in the form of a stack of woven fabric layers. The woven fabric layers of the stack of layers are preferably not bonded to each other, but rather are free to move with respect to each other. If desired, the stack of woven fabric layers can be stitched or tacked together, such as at their corners, so that the stack of layers stays intact. The woven fabric layer or layers preferably comprise high tenacity fibers, although fabrics from other fibers (synthetic and/or natural) may be used depending on the desired properties of the composite and body armor.

For the purposes of the present invention, a fiber is an elongate body the length dimension of which is much greater that the transverse dimensions of width and thickness. Accordingly, the term "fiber" includes monofilament, multifilament, ribbon, strip, staple and other forms of chopped, cut or discontinuous fiber and the like having regular or irregular cross-sections. The term "fiber" includes a plurality of any of the foregoing or a combination thereof. A yarn is a continuous strand comprised of many fibers or filaments. Fibers may also be in the form of split film or tape.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably circular.

As used herein, the term "high tenacity fibers" means fibers which have tenacities equal to or greater than about 7 g/d. Preferably, these fibers have initial tensile moduli of at least about 150 g/d and energies-to-break of at least about 8 J/g, as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

High strength fibers useful in the yarns and fabrics of the invention include, without limitation, highly oriented high molecular weight polyolefin fibers, particularly high modulus (or high tenacity) polyethylene fibers and polypropylene fibers, aramid fibers, polyvinyl alcohol fibers, polyacrylonitrile fibers, liquid crystal copolyester fibers, polyamide fibers, polyester fibers, glass fibers, graphite fibers, carbon fibers, basalt or other mineral fibers, rigid rod polymer fibers, and mixtures and blends thereof. Preferred high strength fibers useful in this invention (in the woven fabric layer and in the second fabric layer) include high tenacity polyethylene fibers, aramid fibers, and mixtures and blends thereof.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. Nos. 4,137,394 and 4,356,138), or a filament spun from a solution to form a gel structure (see U.S. Pat. No. 4,413,110, German Off. No. 3,004,699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-l-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are available, for example, under the trademark SPECTRA® fibers and yarns from Honeywell International Inc. of Morristown, N.J., U.S.A.

Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an lnstron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Preferably the polyethylene employed is a polyethylene having fewer than about one methyl group per thousand carbon atoms, more preferably fewer than about 0.5 methyl groups per thousand carbon atoms, and less than about 1 weight percent of other constituents.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of extended chain polyethylene fibers, preparation and drawing of gel-spun polyethylene fibers are described in various publications, including U.S. Pat. Nos. 4,413,110; 4,430,383; 4,436,689; 4,536,536; 4,545,950; 4,551,296; 4,612,148; 4,617,233; 4,663,101; 5,032,338; 5,246,657; 5,286,435; 5,342,567; 5,578,374; 5,736,244; 5,741,451; 5,958,582; 5,972,498; 6,448,359; 6,969,553 and 7,344,668, the disclosures of which are expressly incorporated herein by reference to the extent not inconsistent herewith.

In the case of aramid fibers, suitable fibers formed from aromatic polyamides are described, for example, in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 300, 400, 500, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV-OH) fibers having high tensile modulus are described in U.S. Pat. No. 4,440,711 to Kwon et al., the disclosure of which is hereby incorporated by reference to the extent it is not inconsistent herewith. High molecular weight PV-OH fibers should have a weight average molecular weight of at least about 200,000. Particularly useful PV-OH fibers should have a modulus of at least about 300 g/d, a tenacity preferably at least about 10 g/d, more preferably at least about 14 g/d and most preferably at least about 17 g/d, and an energy to break of at least about 8 J/g. PV-OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470. Liquid crystal copolyester fibers are available under the designation Vectran® fibers from Kuraray America Inc.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

Preferred high tenacity fibers for the woven fabric layers are high tenacity polyethylene fibers, aramid fibers, and blends thereof. In one particularly preferred embodiment the woven fabric layers comprise aramid fibers.

When the woven fabric layers comprise high tenacity fibers, they are preferably formed from all or substantially all high tenacity fibers. Alternatively, at least about 50% by weight of the fibers in the woven fabric layers are high tenacity fibers and more preferably at least about 75% by weight of the fibers in the woven fabric layers are high tenacity fibers.

The woven fabrics in these layers can be woven in any desired weave pattern, including plain, basket, twill, satin, three dimensional woven fabrics, and any of their several variations. Plain weave fabrics are preferred. In one preferred embodiment these fabrics have an equal warp and weft count. The woven fabric layers may or may not include a resin matrix.

The yarns of the woven fabric layers may be twisted, over-wrapped or entangled. The woven fabric layers can be woven with yarns having different fibers in the warp and weft directions, or in other directions. For example, a woven fabric may be formed with aramid fibers in the warp direction and high tenacity polyethylene fibers in the weft direction, or vice versa.

The number of layers of the woven fabric in the flexible composite or in the soft body armor may vary widely, depending on the type of fiber employed, desired weight, desired performance characteristics, etc. of the composite or body armor, as well as the total areal density of the product and the threat levels against which the product is designed.

The woven fabric layer or layers or stacks thereof are preferably positioned at the front or outside facing direction of the soft body armor, but alternatively it may be positioned at the rear or inside facing direction. These directions are with respect to the body of the user of the armor.

Examples of woven fabrics that may be employed in this invention include style numbers 737, 751, 768, 1028, 1129, and the like, and blends thereof.

The soft body armor and flexible ballistic composite of this invention also include at least one second fabric layer that comprises high tenacity fibers of the type described above. Particularly preferred high strength fibers useful in the second fabric layers of this invention include high tenacity polyethylene fibers, aramid fibers, and mixtures and blends thereof.

Preferably there is a plurality of the second fabric layers, and preferably these are in the form of a stack of second fabric layers. The fabric layers of the stack of second fabric layers are preferably not bonded to each other (except for individual plies that form a layer, as is described below), but rather are free to move with respect to each other. If desired, these fabric layers may also be stitched or tacked together (e.g., at their corners) so that the stack of layers can remain intact.

It is preferred that the second fabric layer (or layers) does not itself include any plastic film layer; that is, a plastic film is not laminated or attached to any layer or group of layers of the second fabric layer. Likewise a stack of second fabric layers preferably does not include a plastic film within the layers that form the stack of layers.

The second fabric layers of this invention are preferably formed from all or substantially all high tenacity fibers. Alternatively, at least about 50% by weight of the fibers in the second fabric layers are high tenacity fibers and more preferably at least about 75% by weight of the fibers in the second fabric layers are high tenacity fibers.

The second fabric layer may be in any suitable form of fabric, such as a woven fabric, a non-woven fabric (such as a unidirectionally oriented fabric, a felted fabric, a spun-bonded fabric, and the like), a knitted fabric, a braided fabric, a paper fabric, and the like. Preferably the second fabric layer is in the form of a non-woven fabric, most preferably a fabric comprising unidirectionally oriented fibers.

As is known, in such an arrangement the unidirectionally oriented fibers are substantially aligned parallel to one another along a common fiber direction. The unidirectionally oriented fabric may include a minor amount of a material which provides some cross-directional stability to the product; such material may be in the form of fibers, yarns or adhesive yarns all of which are not high tenacity materials, or resins, adhesives, films and the like that may be spaced along the length of the unidirectionally oriented fabric but extend at an angle thereto. Such materials, if present, may comprise up to about 10%, more preferably up to about 5%, by weight of the total weight of the non-woven fabric.

Such unidirectional non-woven fabrics preferably are employed in multiple layers, with the fibers in one unidirectionally oriented fiber layer extending in one direction and the fibers in an adjacent layer extending at an angle with respect to the direction of the fibers in the first layer. For example, successive plies may be rotated relative to one another, for example at angles of 0°/90°, 0°/90°/0°/90°, 0°/45°/90°/45°/0° or at other angles.

The unidirectional non-woven fabrics may be constructed via a variety of methods. Preferably, yarn bundles of the high tenacity filaments are supplied from a creel and led through guides and into a collimating comb. The collimating comb aligns the filaments coplanarly and in a substantially unidirectional fashion. The fibers may then be led into one or more spreader bars which may be included in a coating apparatus, or may be located before or after the coating apparatus.

The second fabric may alternatively be formed from a non-woven fabric such as a fabric in the form of a felt, such as needle punched felts. A felt is a non-woven network of randomly oriented fibers, preferably at least one of which is a discontinuous fiber, preferably a staple fiber having a length ranging from about 0.25 inch (0.64 cm) to about 10 inches (25 cm). These felts may be formed by several techniques known in the art, such as by carding or fluid laying, melt blowing and spin laying. The network of fibers is consolidated mechanically such as by needle punching, stitch-bonding, hydro-entanglement, air entanglement, spunbond, spun lace or the like, chemically such as with an adhesive, or thermally with a fiber to point bond or a blended fiber with a lower melting point.

Another alternative is that the second fabric may be in the form of a paper fabric that may be formed, for example, by pulping a liquid containing the high tenacity fibers.

The second fabric layer is preferably coated with a matrix resin composition. As used herein, the term "coating" is used in a broad sense to describe a fiber network wherein the individual fibers either have a continuous layer of the matrix composition surrounding the fibers or a discontinuous layer of the matrix composition on the surface of the fibers. In the former case, it can be said that the fibers are fully embedded in the matrix composition. The terms coating and impregnating are interchangeably used herein.

One method of forming the second fiber layers is to initially form a fiber network layer, preferably a unidirectional network as described above, applying a solution, dispersion or emulsion of the matrix composition onto the fiber network layer, and then drying the matrix-coated fiber network layer. The solution, dispersion or emulsion may be an aqueous product of the matrix resin, which may be sprayed onto the filaments. Alternatively, the filament structure may be coated with the solution, dispersion or emulsion by dipping or by means of a roll coater or the like. After coating, the coated fibrous layer may then be passed through an oven for drying in which the coated fiber network layer is subjected to sufficient heat to evaporate the water or other solvent in the matrix composition. The coated fibrous network may then be placed on a carrier web, which can be a paper or a film substrate, or the fibers may initially be placed on a carrier web before coating with the matrix resin. The substrate and the consolidated layer can then be wound into a continuous roll in a known manner.

The consolidated individual plies of unidirectionally oriented fabric can be cut into discrete sheets and laid up into a stack for formation into the end use composite. As mentioned previously, the most preferred composite is one wherein the fiber network of each layer is unidirectionally aligned and the layers are angled so that the fiber directions in successive layers are in a 0°/90° orientation.

As noted above, the high tenacity fibers of the second fabric layer are preferably coated with a matrix resin composition and then the matrix composition/fibers combination is consolidated. By "consolidating" is meant that the matrix material and the fibrous layer are combined into a single unitary layer. Consolidation can occur via drying, cooling, heating, pressure or a combination thereof.

The resin matrix that may be incorporated in the various fabric layers may be formed from a wide variety of thermoplastic, thermosetting or elastomeric materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

Alternatively, the resin matrix may be selected to have a high tensile modulus when cured, as at least about $1 \times 10^5$ psi (690 MPa). Examples of such materials are disclosed, for example, in U.S. Pat. No. 6,642,159, the disclosure of which is expressly incorporated herein by reference to the extent not inconsistent herewith.

If present, the proportion of the resin matrix material to fiber in the various layers may vary widely depending upon the end use. The resin matrix material preferably forms about 1 to about 98 percent by weight, more preferably from about 5 to about 95 percent by weight, and still more preferably from about 5 to about 40 percent by weight, and most preferably from about 10 to about 25 percent by weight, based on the total weight of the fibers and resin matrix.

A wide variety of elastomeric materials may be utilized as the resin matrix. For example, any of the following materials may be employed: polybutadiene, polyisoprene, natural rubber, nitrile rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins for polyethylene fiber fabrics include at least one vinyl ester, diallyl phthalate, and optionally a catalyst for curing the vinyl ester resin.

One preferred group of materials for polyethylene fiber fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene and/or polybutadiene may be hydrogenated to produce thermoplastic elastomers having saturated hydrocarbon elastomer segments. The polymers may be simple tri-block copolymers of the type $R-(BA)_x$ (x=3-150); wherein A is a block from a polyvinyl aromatic monomer and B is a block from a conjugated diene elastomer, or an A-B-A type of elastomer; one such resin matrix is an styrene-isoprene-styrene block copolymer, such as Kraton® D1107 styrene-isoprene-styrene block copolymer available from Kraton Polymer LLC.

Particularly preferred matrix resins for aramid fibers include nitrile rubber, a thermoplastic polyurethane resin, such as a water-based polyurethane resin, and mixtures thereof, and mixtures thereof. Of the polyurethane resins, particularly preferred is a polyurethane resin that is a copolymer mix of polyurethane resins in water, such as a copolymer mix of polyurethane resins that is applied as a dispersion in water, and has a relative density of 1.05 g/cc at 23° C. and a viscosity of 40 cps at 23° C. The latter type of matrix resin is disclosed, for example, in copending U.S. patent application Ser. No. 11/213,253, filed Aug. 26, 2005, (published as US 2009-0025111), the disclosure of which is incorporated herein by reference to the extent not inconsistent herewith.

A particularly preferred nitrile rubber matrix resin is disclosed in copending U.S. patent application Ser. No. 11/962,533, filed Dec. 21, 2007, the disclosure of which is incorporated herein by reference to the extent not inconsistent herewith. Such preferred nitrile rubber binders have an acrylontrile content of from about 15 weight percent to about 50 weight percent, preferably from about 15 weight percent to about 30 weight percent. Preferably, the nitrile rubber is uncured (non-crosslinked). Nitrile rubber polymers are a family of unsaturated copolymers of acrylonitrile and butadiene and many different types are available having different properties.

In one preferred embodiment of the invention, the nitrile rubber polymers comprise nitrile rubber terpolymers comprising an acrylonitrile monomer, a butadiene monomer and another monomer component, such as N-methylol acrylamide or a carboxylic acid, such as methacrylic acid. Preferably the nitrile rubber comprises a carboxylated nitrile rubber (XNBR) terpolymer. A preferred XNBR terpolymer preferably comprises from about 0.1 weight percent to about 20 weight percent of the carboxylic acid monomer, more preferably from about 1 weight percent to about 10 weight percent and most preferably from about 1 weight percent to about 5 weight percent of the carboxylic acid monomer. These amounts are not intended to be limiting.

Preferably, the layers of the second fabric may be formed from a plurality of individual plies. In one example, a two ply layer is formed. In another example, a four ply layer is formed, which may comprise two of the two ply layers combined together such as by lamination. Preferably, the adjacent layers of the second fabric are arranged such that the directions of the fibers in adjacent layers are at an angle to each other, preferably about 90° to one another.

Similar to the number of layers mentioned above for the woven fabric in the flexible composite or in the soft body armor, the number of layers of the second fabric in the flexible composite or in the soft body armor may vary widely. Similar factors include the type of fiber employed, desired weight, desired performance characteristics, etc. of the composite or body armor, as well as the total areal density of the product and the threat levels against which the product is designed. As mentioned above, each layer of the second fabric may be formed from a plurality of plies, each of which would be considered a layer of the second fabric.

The yarns useful in the various fibrous layers may be of any suitable denier, and may be of the same or different deniers in each layer. For example, the yarns may have a denier of from about 50 to about 3000. The selection is governed by considerations of ballistic effectiveness, other desired properties, and cost. For woven fabrics, finer yarns are more costly to manufacture and to weave, but can produce greater ballistic effectiveness per unit weight. The yarns are preferably from about 200 denier to about 3000 denier. More preferably, the yarns are from about 400 denier to about 2000 denier. Most preferably, the yarns are from about 500 denier to about 1600 denier.

In accordance with this invention the soft body armor and flexible composites further include a first separator layer that is positioned between the woven fabric layer or layers and the second fabric layer or layers. Where there are stacks of the woven fabric layers and stacks of the second fabric layers, the first separator layer is positioned between the two stacks. The first separator layer comprises a lightweight, thin and flexible layer having an areal density of less than or equal to about 150 g/m². The first separator layer is not laminated to either of the woven fabric layer(s) or the second fabric layer(s), or where stacks of such layers are employed, to either the stack of woven fabric layers or the stack of second fabric layers. As a result, the woven fabric layer(s) and the second fabric layer(s), or the stacks thereof, are free to move relative to each other. Preferably, the first separator layer is completely separated from the woven fabric layer(s) and the second fabric layer(s), or the stacks thereof. In this preferred embodiment, the first separator layer is freely floating between the layers or between the stacks of layers.

The first separator layer is chosen so as to not add any appreciable weight to the body armor or composite. The areal density of the first separator layer is preferably equal to or less than about 150 g/m², and preferably less than or equal to about 90 g/m². Stated another way, the areal density of the first separator layer preferably is from about 5 to about 150 g/m², more preferably from about 8 to about 90 g/m², and most preferably from about 20 to about 60 g/m².

In addition, the first separator layer is a thin structure. By "thin" is meant that the first separator layer has a thickness of less than or equal to about 5 mils (about 127 µm), and preferably less than or equal to about 3 mils (about 76 µm), more preferably less than or equal to about 2 mils (about 51 µm), and most preferably less than or equal to about 1.5 mils (about 38 µm). Stated in another way, preferably the first separator layer has a thickness of from about 0.3 to about 3 mils (about 8 to about 76 µm), more preferably from about 0.5 to about 2.5 mils (about 13 to about 64 µm) and most preferably from about 1 to about 2 mils (about 25 to about 51 µm). Preferably the separator layer is as thin as possible in order to maintain the desired lightweight nature of the structure, but yet is still easy to be handled during manufacture of the products of the invention and also provides enhanced abrasion resistance.

Such thin structures are also flexible so that the soft body armor and ballistic composite retain their flexible nature. By "flexible" is meant that the separator layer is incapable of free standing without collapsing, such as when the separator layer is positioned on an edge thereof.

The first separator layer preferably is in the form of a film, but other structures having the requisite properties may be used, such as newsprint, coated paper, wax paper, etc. The film that forms the first separator layer is preferably a thermoplastic polymer. Non-limiting examples of such thermoplastic films include nylon films, polyolefin films such as polyethylene films or polypropylene films, polyester films, and the like. The most presently preferred material is a biaxially oriented polypropylene film.

The presence of the first separator layer serves to reduce the abrasion that might otherwise occur between the woven layer(s) and the second fabric layer(s), or between stacks of such layers. The first separator layer improves the abrasion resistance between the two layers or sets of layers such that there is no significant abrading of the fibers of the adjacent layers. Some users and specifications may require that the various filler components of the body armor not excessively abrade each other, such that there is desirably no fabric structure change in the fiber layers or there is only a slight change in surface appearance and minimum fiber breakage in the fiber layers. This is to be distinguished between a moderate change in surface appearance with significant breakage of fibers in the center of the abrasion area (with no appearance of a hole) or a severe change in surface appearance with most or all of the fibers in the center of the abrasion area being worn or broken off. Oftentimes it may not be known when designing a soft body armor or components thereof that there may be excessive abrasion between various layers in the filler materials of a body armor until such armor is tested. The first separator layer of this invention can be used in conjunction with the other layers to provide the requisite abrasion resistance that may be required in these circumstances.

The presence of the first separator layer in the body armor and composite of this invention provides reduced abrasion between adjacent fabric layers. Also, the presence of the first separator layer does not adversely affect or substantially adversely affect the ballistic properties of the body armor or composite.

Although a plurality of the first separator layers may be used, it is not necessary to do so in order to obtain the desired beneficial results of reduced abrasion. Also, the addition of multiple separator layers may increase the weight of the structure without an attendant diminution of abrasion between adjacent layers. Accordingly, it is preferred to employ a single first separator layer, although there may be circumstances that call for additional first separator layers.

In order to obtain increased protection against abrasion between the layers or stacks of layers of the body armor or composite, the surface area of the major surfaces of the first separator layer is such that such layer covers all or substantially all of the surface area of the major surfaces of the adjacent woven fabric layer(s), the second fabric layer(s), or the stacks of layers when utilized.

In certain applications, particularly soft body armor useful in military applications, it may also desired be that the body armor does not significantly take up water (e.g., sea water) or petrochemicals (e.g., oil, gasoline, diesel fuel, etc.) when immersed for a specified period of time, such that the ballistic performance of the soft body armor is not substantially adversely affected. For example, in one test the body armor may be subjected to 24 hour immersion in sea water and in another test the body armor may be subjected to a 4 hour submersion in gasoline. The components of the body armor of this invention (including matrix resin) may be chosen so that the body armor meets such test requirements. The presence of the first separator layer in the structures of this invention does not detract from the acceptable performance levels of the body armor with respect to such tests.

As pointed out above, in some applications it is desirable to employ a second separator layer that is positioned between the soft body armor cover and the second fabric layer(s) or the stack of second fabric layers. The second separator layer serves to reduce the abrasion between the cover and the second fabric layer(s) or the stack of second fabric layers.

The second separator layer also comprises a lightweight, thin and flexible layer having an areal density of less than or equal to about 150 g/m². The second separator layer is not laminated to either of the second fabric layer(s) or the cover, or where stacks of the second fabric layers are employed, to the stack of second fabric layers. As a result, the second fabric layer(s), or the stacks thereof, and the cover, are free to move relative to each other. Preferably, the second separator layer is completely separated from the second fabric layer(s) (or the stacks thereof) and the cover. In this preferred embodiment, the second separator layer is freely floating between the cover and the second fabric layer(s) or between the cover and stacks of second fabric layers.

The second separator layer has the same parameters of properties as mentioned above with respect to the first separator layer (namely, being lightweight, thin, flexible and having an areal density less than or equal to about 150 g/m²), but the properties of the second separator layer need not chosen to be exactly the same as those of the first separator layer. The areal density of the second separator layer is preferably equal to or less than about 150 g/m²), preferably less than or equal to about 90 g/m² and more preferably less than about 60 g/m². Stated another way, the areal density of the second separator layer preferably is from about 5 to about 150 g/m², more preferably from about 8 to about 90 g/m², and most preferably from about 20 to about 60 g/m². The thickness of the second separator layer may be of the same range or ranges mentioned above with respect to the first separator layer, which is not repeated herein for the sake of brevity. The second separator layer may be of the same type of materials as mentioned above with respect to the first separator layer, but again the materials in the first and second separator layer need not be the same.

Preferably, the second separator layer comprises a film, such as a thermoplastic film. Non-limiting examples of such films include nylon films, polyolefin films such as polyethylene films or polypropylene films, polyester films, and the like. The most presently preferred material is a biaxially oriented polypropylene film.

Desirably for ease of construction and for symmetry purposes, the first and second separator layers may be identical to each other. In this manner, a single type of separator layer may be pre-qualified for use in specific soft body armor applications.

Particularly preferred embodiments of the invention include a structure of a stack of aramid woven fabrics, a first separator film, a stack of aramid unidirectionally oriented second fabric layers that include a matrix resin (such as the aforementioned thermoplastic polyurethane resins or nitrile rubber), and a second separator film. The entire structure is within a cover for the soft body armor.

In one embodiment of this invention, especially when the cover comprises a woven fabric, it may be desired to use only one type of fabric material in the soft body armor. In this embodiment, the fabric comprises at least one layer of a fabric, preferably a non-woven fabric, comprising high tenacity fibers having a tenacity of at least about 7 g/d. These fibers may be of the same type mentioned above with respect to the second fabric layer. In this situation, there is a first separator layer positioned between a first side of the non-woven fabric layer and the cover, and a second separator layer positioned between the cover and an opposite, second side of the non-woven fabric layer. The first and second separator layers both have areal densities of less than or equal to about 150 g/m², and the materials and properties of the first separator layer and second separator layer in this embodiment may be chosen from those mentioned above.

In one aspect of this embodiment, the non-woven fabric preferably comprises a plurality of unidirectionally oriented plies that are cross-plied with respect to each other and which are coated with a matrix resin. This embodiment is particularly useful where the fibers of the non-woven fabric comprise aramid fibers that are unidirectionally oriented and where the matrix resin comprises a nitrile rubber. Also as mentioned above, the layers of the non-woven fabric may be formed from a two ply layer or a four ply layer that is formed from two of the two ply layers combined together such as by lamination, or from additional layers. Preferably, the adjacent layers of the non-woven fabric are arranged such that the directions of the fibers in adjacent layers are at an angle to each other, preferably about 90° to one another. As mentioned above with respect to the second fabric layer, the non-woven fabric layer of this embodiment may be in the form of a stack of layers. In this case the stack of layers has a first surface that is adjacent to the cover and an opposite, second surface that is also adjacent to the cover. In this embodiment there are first and second separator layers that are positioned between both sides of the fabric layer, or stack of fabric layers, and the cover. The separator layers are not laminated to the cover or either side of the layer or stack of layers, and thus the fabric layer or stack of layers and the cover are free to move relative to one another. Most preferably the separator layers are completely separated from the cover and the non-woven fabric layer, or stack of layers, such that the separator layers are freely floating in the structure.

In this type of structure there is no need for a woven fabric layer to be included within the soft body armor cover and the only fabric layers that need be present are the non-woven fabric layer or layers (or stack of layers) that provide the ballistic resistant properties.

A specific example of this embodiment is a soft body armor that includes a woven fabric cover, a first separator layer (preferably a film), a plurality of non-woven unidirectionally oriented plies of aramid fibers in a resin matrix comprising a nitrile rubber, and a second separator layer (preferably a film), with the separator layers not being laminated to the cover or to the non-woven fabric.

The soft body armor and composites of this invention may comprise the components hereinabove mentioned, or consist essentially of such components, or consist of such components.

If desired, additional layers may be employed in the structures of this invention. For example, there can be one or more additional woven fabric layer(s) or stacks of woven fabric layers and/or one or more additional second fabric layer(s) or stacks of second fabric layers. As an example, the total number of layers of the stack of woven fabric layers can be split into two stacks, and the total number of the stack of second fabric layers can also be split into two stacks. In this case, there would be a symmetrical lay-up, with the structure being: stack of woven fabric layers/stack of second fabric layers/stack of woven fabric layers/stack of second fabric layers. In such case, an additional separator layer would be employed so that each stack of layers is separated from the adjacent stack of layers by a separator layer.

In another embodiment, an additional separator layer may be positioned between the cover and the woven fabric layer(s) or stack of woven fabric layers, but typically this is not necessary.

In a further embodiment, there may be three fabric layers—such as a first woven fabric layer or layers (or stack of layers thereof) adjacent to a second fabric layer or layers (or stack of layers thereof) which is adjacent to another woven fabric layer or layers (or stack thereof). In such case there would be a separator layer at each interface between the woven fabric layer(s), or stacks thereof, and the second fabric layer(s), or stack thereof. Alternatively there could be two second fabric layers with a woven fabric layer in between those layers. Other structures can also be readily determined by one skilled in the art depending on the desired properties of the soft body armor or composite. Such structures may include, for example, layers of dissimilar materials that are combined together (e.g., woven layers laminated to non-woven layers, etc.).

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

The abrasion resistance of a structure comprising a woven aramid fabric and a non-woven aramid fabric was tested. The structure was a single woven aramid fabric (style 1129) and a single laminate of a two ply unidirectionally oriented aramid non-woven fabric of 1000 denier aramid yarns, in which the two plies are cross-plied at 90°. The woven aramid fabric had a water repellant finish but no matrix resin. The unidirectionally oriented aramid fabric had a matrix resin of a thermoplastic polyurethane resin that is a copolymer mix of polyurethane resins in water, applied as a dispersion in water, and has a relative density of 1.05 g/cc at 23° C. and a viscosity of 40 cps at 23° C. The percent of the resin in the non-woven aramid fabric was about 15 to 15.5% by weight, based on the total weight of the fabric plus resin.

A separator layer of a nylon 6 biaxially oriented film (Capran® Emblem 1500T from Honeywell International Inc.), having a thickness of 0.6 mils (15 μm) was used, and had an areal density of 17.6 g/m². The separator layer was interposed between the woven aramid fabric and the non-woven aramid fabric.

The abrasion resistance of the structure was measured in accordance with ASTM D-3886, as modified. The woven aramid fabric was used as the abradant and is mounted on the surface abrasion head. The aramid non-woven fabric is the sample to be tested and is mounted on a diaphragm. The separator film is placed over the aramid non-woven fabric. The diaphragm is inflated to 4.0 psi (27.6 kPa) with a top load of 5.0 pounds (2.27 kg). All of the fabric and film samples were of circular shape of 4.125 inch (108 mm) diameter. The system is tested for a minimum of 2000 cycles, during which the woven fabric sample is held stationary and the non-woven fabric sample oscillated and rotated with respect to the woven fabric sample.

After the test, the non-woven fabric sample is visually examined and rated according to the following criteria:

1. Severe change in appearance with most or all of the fibers in the center of the abrasion area worn off or broken.
2. Moderate change in surface appearance with significant breakage of fibers in the center of the abrasion area and no appearance of a hole.
3. Slight change in surface appearance and minimal fiber breakage.
4. No fabric structure change.

A rating of ≥3 is required to pass the test.

The above-described structure was subjected to the referenced abrasion test, and the structure had the highest rating (#4- no fabric structure change).

Example 2

Example 1 was repeated except that the aramid woven fabric was style 768 and the first separator layer was a heat stabilized nylon 6 film (Capran® 980 from Honeywell International Inc.), having a thickness of 3.0 mils (76 μm). The areal density of this film was 87.9 g/m².

When subjected to the above-mentioned abrasion test, the composite passed the test, with the highest rating (#4—no fabric structure change).

Examples 3-5

In Example 3, a structure similar to that of Example 1 is tested under a similar abrasion resistance test; the separator layer is a biaxially oriented polypropylene film having a thickness of 0.5 mil (13 μm) and an areal density of 11.5 g/m². The sample is found to pass the abrasion test. In Example 4, Example 3 is repeated except that the separator layer was a film of polyethylene terephthalate having a thickness of 0.9 mil (23 μm) and an areal density of 32.1 g/m². The sample is found to pass the abrasion test. In Example 5, Example 3 is repeated except that the separator layer is an ultrahigh density polyethylene film having a thickness of 0.5 mil (13 μm) and an areal density of 12.4 g/m². This sample is also found to pass the abrasion test.

It can be seen that this invention provides soft body armor and composites that have excellent abrasion resistance. This is achieved without affecting, or substantially affecting, the ballistic resistance of the soft body armor or composite.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. Soft body armor comprising:
a cover,
at least one stack of a plurality of woven fabric layers positioned within said cover,
at least one stack of a plurality of second fabric layers also positioned within said cover and being adjacent to said stack of a plurality of woven fabric layers, said second fabric layers comprising high tenacity fibers having a tenacity of at least about 7 g/d, and wherein said second fabric layers comprise unidirectionally oriented non-woven fabrics;
a first separator layer positioned between said stack of woven fabric layers and said stack of second fabric layers, said first separator layer consisting of a lightweight, thin and flexible thermoplastic film having an areal density of from 15 g/m² to 50 g/m², said first separator layer not being laminated or otherwise attached or connected to either of said stack of woven fabric layers or said stack of second fabric layers, said first separator layer spacing said stack of woven fabric layers and said stack of second fabric layers apart from each other such that said two stacks of layers are unattached to each other and are free to move relative to each other, and a second separator layer positioned between said stack of second fabric layers and said cover, said second separator layer consisting of a lightweight, thin and flexible thermoplastic film having an areal density of from 15 g/m² to 50 g/m², said second separator layer not being laminated or otherwise attached or connected to either of said stack of second fabric layers or said cover, said second separator layer spacing said stack of second fabric layers and said cover apart from each other such that said stack of second fabric layers and said cover are unattached to each other and are free to move relative to each other.

2. The soft body armor of claim 1 wherein said second fabric layers consist of cross-plied unidirectionally oriented non-woven fabrics, and wherein said stack of the plurality of second fabric layers consists of said cross-plied unidirectionally oriented non-woven fabrics.

3. The soft body armor of claim 2 wherein each of said second fabric layers is formed from a plurality of plies of unidirectionally oriented non-woven fabric, said plies being arranged such that they are angled with respect to each other.

4. The soft body armor of claim 3 wherein each of said second fabric layers consist of fibers and a matrix resin wherein said resin comprises from 10 percent to about 25 percent by weight, based on the total weight of the fibers and resin matrix.

5. The soft body armor of claim 1 wherein the woven fabric layers of said at least one stack of woven fabric layers are not bonded to each other and are free to move with respect to each other, and wherein the fabric layers of said stack of second fabric layers are not bonded to each other and are free to move with respect to each other, wherein a plastic film is not laminated or attached to any layer or group of layers in the stack of second fabric layers.

6. The soft body armor of claim 4 wherein said matrix resin is selected from the group consisting of a thermoplastic polyurethane resin, a nitrile rubber and mixtures thereof.

7. The soft body armor of claim 4 wherein said matrix resin comprises thermoplastic polyurethane resins, said thermoplastic polyurethane resins comprising a copolymer mix of polyurethane resins, said copolymer mix comprising more than one polyurethane copolymer resin.

8. The soft body armor of claim 7 wherein said thermoplastic polyurethane resin is applied as a dispersion in water, the dispersion having a relative density of 1.05 g/cc at 23 ° C. and a viscosity of 40 cps at 23 ° C.

9. The soft body armor of claim 4 wherein said matrix resin is elastomeric and comprises a nitrile rubber terpolymer comprising an acrylonitrile monomer, a butadiene monomer and either an N-methylol acrylamide monomer or a carboxylic acid monomer, and wherein the fibers are fully embedded in the matrix resin.

10. The soft body armor of claim 3 wherein each of said second fabric layers consist of fibers and a matrix resin, wherein said fibers of said second fabric layers are selected from the group consisting of high tenacity polyethylene fibers, aramid fibers and blends thereof and wherein said resin comprises more than 5 percent to about 40 percent by weight of the second fabric layers, based on the total weight of the fibers and resin matrix.

11. The soft body armor of claim 3 wherein said woven fabric layers comprise aramid fibers and said second fabric layers comprise aramid fibers.

12. The soft body armor of claim 11 wherein said second fabric layers comprise a matrix resin selected from the group consisting of a thermoplastic polyurethane resin, a nitrile rubber and mixtures thereof.

13. The soft body armor of claim 12 wherein said cover comprises a rip stop nylon woven fabric and contains compartments or pockets within which the at least one stack of a plurality of woven fabric layers and the at least one stack of a plurality of second fabric layers are positioned.

14. The soft body armor of claim 3 wherein said woven fabric layers comprise aramid fibers, said second fabric layers comprise a plurality of plies, said plies comprising two layers consisting of unidirectionally oriented non-woven fabrics of aramid fibers in an elastomeric nitrile rubber matrix resin, which two layers of said plies are cross-plied with respect to each other and wherein said thermoplastic film of said first separator layer and said thermoplastic film of said second separator layer are each a polypropylene film.

15. The soft body armor of claim 1 wherein said woven fabric layers comprise high tenacity polyethylene fibers having a tenacity of at least about 30 g/d.

16. The soft body armor of claim 1 wherein said cover comprises a woven nylon fabric, and wherein said fibers of said second fabric layers are selected from the group consisting of high tenacity polyethylene fibers, aramid fibers and blends thereof.

17. The soft body armor of claim 1 wherein the woven fabric layers of the stack of a plurality of woven fabric layers are not bonded to each other; and wherein the second fabric layers of the stack of a plurality of second fabric layers are not bonded to each other except for individual plies that form a layer of unidirectionally oriented non-woven fabric, wherein said woven fabric layers comprise aramid fibers or polyethylene fibers, and said second fabric layers comprise aramid fibers or polyethylene fibers.

18. The soft body armor of claim 1 wherein said thermoplastic film of said first separator layer and said thermoplastic film of said second separator layer are each a polypropylene film.

19. The soft body armor of claim 1 wherein each of said first separator layer and said second separator layer is a biaxially oriented polypropylene film.

20. The soft body armor of claim 17 wherein the thickness of said first separator layer and said second separator layer is from about 1 to about 2 mils (about 25 to about 51 μm), and wherein said thermoplastic film of said first separator layer and said thermoplastic film of said second separator layer are each a polypropylene film.

21. The soft body armor of claim 16 wherein the thickness of said first separator layer and said second separator layer is less than or equal to about 1.5 mils (38 μm), and wherein said thermoplastic film of said first separator layer and said thermoplastic film of said second separator layer are each a polypropylene film.

22. The soft body armor of claim 1 wherein said body armor comprises a vest.

23. Soft body armor comprising:
at least one woven fabric layer,
at least one second fabric layer comprising high tenacity fibers having a tenacity of at least about 7 g/d, wherein said second fabric layer comprises a unidirectionally oriented non-woven fabric; and
a first separator layer positioned between said woven fabric layer and said second fabric layer, said first separator layer consisting of a lightweight, thin and flexible thermoplastic film having an areal density of from 15 g/m² to 50 g/m², said separator layer not being laminated or otherwise attached or connected to either of said woven fabric layer or said second fabric layer, said first separator layer spacing said woven fabric layer and said second fabric layer apart from each other such that said woven fabric layer and said second fabric layer are unattached to each other and are free to move relative to each other.

24. The soft body armor of claim 23 comprising:
a plurality of said woven fabric layers positioned in the form of a stack of layers,
a plurality of said second fabric layers positioned in the form of a stack of layers, wherein each of said second fabric layers comprises a unidirectionally oriented non-woven fabric; and
wherein said first separator layer is positioned between said stack of woven fabric layers and said stack of second fabric layers, said separator layer not being laminated or otherwise attached or connected to either of said stack of woven fabric layers or said stack of second fabric layers, said first separator layer spacing said stack of woven fabric layers and said stack of second fabric layers apart from each other such that said two stacks of layers are unattached to each other and are free to move relative to each other.

25. A flexible ballistic composite useful in soft armor applications, said composite comprising:
at least one woven fabric layer,
at least one second fabric layer comprising high tenacity fibers having a tenacity of at least about 7 g/d, wherein said second fabric layer comprises a unidirectionally oriented non-woven fabric; and
a first separator layer positioned between said woven fabric layer and said second fabric layer, said first separator layer consisting of a lightweight, thin and flexible thermoplastic film having an areal density of from 15 g/m$^2$ to 50 g/m$^2$, said first separator layer not being laminated or otherwise attached or connected to either of said woven fabric layer or said second fabric layer, said first separator layer spacing said woven fabric layer and said second fabric layer apart from each other such that said woven fabric layer and said second fabric layer are unattached to each other and are free to move relative to each other.

26. The flexible ballistic composite of claim 25 wherein said woven fabric layer comprises an aramid fabric, said second fabric layer comprises at least one non-woven layer of aramid fibers.

27. Soft body armor comprising:
a cover,
a single fabric layer or a stack comprising a plurality of fabric layers, each fabric layer comprising high tenacity fibers having a tenacity of at least about 7 g/d, wherein each fabric layer comprises a unidirectionally oriented non-woven fabric, and said single fabric layer or said stack having a first side and a second side,
a first separator layer positioned between said cover and said first side of said fabric layer or of said stack, said first separator layer consisting of a lightweight, thin and flexible thermoplastic film having an areal density of from 15 g/m$^2$ to 50 g/m$^2$, said first separator layer not being laminated or otherwise attached or connected to either said cover or said first side of said fabric layer or of said stack, said first separator layer spacing said cover and said first side of said fabric layer or of said stack apart from each other such that said first side of said fabric layer or of said stack and said cover are unattached to each other and are free to move relative to each other, and
a second separator layer positioned between said cover and said second side of said fabric or of said stack, said second separator layer consisting of a lightweight, thin and flexible thermoplastic film having an areal density of from 15 g/m$^2$ to 50 g/m$^2$, said second separator layer not being laminated or otherwise attached or connected to either said cover or said second side of said fabric layer or of said stack, said second separator layer spacing said cover and said second side of said fabric layer or of said stack apart from each other such that said second side of said fabric layer or of said stack and said cover are unattached to each other and are free to move relative to each other.

28. The soft body armor of claim 27 wherein said cover comprises a woven fabric cover and said fabric layer comprises a non-woven fabric layer comprising a plurality of unidirectionally oriented plies that are cross-plied with respect to each other, said plies comprising aramid fibers in a matrix resin.

29. The soft body armor of claim 28 wherein said matrix resin comprises an uncured, elastomeric nitrile rubber.

30. The soft body armor of claim 27 wherein said stack comprises a plurality of unbonded fabric layers that are free to move with respect to each other.

31. A method of improving the abrasion resistance of at least one component of soft body armor along at least one interface with another component of said soft body armor, said method comprising the steps of:
providing at least one woven fabric layer,
providing at least one second fabric layer, said second fabric layer having a tenacity greater than about 7 g/d, wherein said second fabric layer comprises a unidirectionally oriented non-woven fabric; and
positioning a first separator layer between said woven fabric layer and said second fabric layer such that said first separator layer is not laminated or otherwise attached or connected to either of said woven fabric layer or said second fabric layer, said first separator layer spacing said woven fabric layer and said second fabric layer apart from each other such that said woven fabric layer and said second fabric layer are unattached to each other and are free to move relative to each other, said first separator layer consisting of a lightweight, thin and flexible thermoplastic film having an areal density of from 15 g/m$^2$ to 50 g/m$^2$.

32. The method of claim 31 wherein said soft body armor comprises at least one stack of a plurality of said woven fabric layers and at least one stack of a plurality of said second fabric layers, and wherein said positioning step comprises positioning said first separator layer between said stack of woven fabric layers and said stack of second fabric layers such that said first separator layer is not laminated to or otherwise attached or connected either of said stack of woven fabric layers or said stack of second fabric layers, said first separator layer spacing said stack of woven fabric layers and said stack of second fabric layers apart from each other such that said two stacks of layers are unattached to each other and are free to move relative to each other.

33. The method of claim 32 herein said soft body armor includes a cover, wherein said two stacks of layers and said first separator layer are positioned within said cover, and including the step of positioning a second separator layer between said stack of second fabric layers and said cover, said second separator layer consisting of a lightweight, thin and flexible thermoplastic film having an areal density of from 15 g/m² to 50 g/m², said second separator layer not being laminated to or otherwise attached or connected either of said stack of second fabric layers or said cover, wherein said first separator layer spaces said stack of woven fabric layers and said stack of second fabric layers apart from each other such that said two stacks of layers are unattached to each other and are free to move relative to each other, and wherein said second separator layer spaces said stack of second fabric layers and said cover apart from each other such that said stack of second fabric layers and said cover are unattached to each other and are free to move relative to each other.

34. The soft body armor of claim 1 wherein the stack of woven fabric layers and said stack of second fabric layers each have major surfaces, and the first separator layer and second separator layer cover all or substantially all of the surface area of the major surfaces to which they are adjacent.

35. The soft body armor of claim 23 wherein said at least one woven fabric layer and said at least one second fabric layer each have major surfaces, and wherein the first separator layer covers all or substantially all of the surface area of the major surfaces to which it is adjacent.

36. The flexible ballistic composite of claim 25 wherein said at least one woven fabric layer and said at least one second fabric layer each have major surfaces, and wherein the first separator layer covers all or substantially all of the surface area of the major surfaces to which it is adjacent.

37. The soft body armor of claim 27 wherein said fabric layer has major surfaces and the first separator layer and second separator layer cover all or substantially all of the surface area of the major surfaces to which they are adjacent.

* * * * *